(12) United States Patent
Rye et al.

(10) Patent No.: US 9,485,974 B1
(45) Date of Patent: Nov. 8, 2016

(54) ELASTOMERIC COVER FOR THE WEIGHTED HEAD OF A JIG-TYPE FISHING LURE

(71) Applicants: Ryan Patrick Rye, Lawrenceville, GA (US); Shelby Earl Rye, Dickson, TN (US)

(72) Inventors: Ryan Patrick Rye, Lawrenceville, GA (US); Shelby Earl Rye, Dickson, TN (US)

( * ) Notice: Subject to any disclaimer, the term of this patent is extended or adjusted under 35 U.S.C. 154(b) by 268 days.

(21) Appl. No.: 14/247,218

(22) Filed: Apr. 7, 2014

Related U.S. Application Data

(63) Continuation of application No. 14/076,250, filed on Nov. 10, 2013, now abandoned.

(51) Int. Cl.
*A01K 85/00* (2006.01)
(52) U.S. Cl.
CPC .................................... *A01K 85/00* (2013.01)

(58) Field of Classification Search
CPC ..... A01K 85/00; A01K 85/02; A01K 95/005
USPC ............. 43/42.09, 42.1, 42.24, 42.25, 42.28, 43/42.39, 42.06, 42.32, 44.81
See application file for complete search history.

(56) References Cited

U.S. PATENT DOCUMENTS 9,003,689 B1 * 4/2015 Rye ........................ A01K 85/00
43/42.09

* cited by examiner

*Primary Examiner* — Joshua Huson
*Assistant Examiner* — Michael A Fabula

(57) ABSTRACT

A head cover for a jig fishing lure or combination jig and rotating member fishing lure is disclosed which can prevent a fish from directly contacting the hard, weighted jig head of the fishing lure. The head cover can be permanently attached to the fishing lure or it can be a separate removable member. The head cover can combine a soft, elastomeric membrane along with one or more fish-attracting elements. The head cover can also include a flat surface to orient the jig fishing lure at a different angle when resting on the bottom underwater surface.

11 Claims, 13 Drawing Sheets

ELASTOMERIC COVER FOR THE WEIGHTED HEAD OF A JIG-TYPE FISHING LURE

CROSS-REFERENCE TO RELATED APPLICATIONS

This application is a continuation of patent application Ser. No. 14/076,250, filed Nov. 10, 2013 (currently pending), which is a continuation of patent application Ser. No. 12/924,579 (now U.S. Pat. No. 8,640,378), filed Sep. 30, 2010.

BACKGROUND INFORMATION

This disclosure generally relates to artificial fishing lures. More specifically, this disclosure relates to a soft, elastomeric head cover for a jig fishing lure or combination jig and rotating member fishing lure.

A jig fishing lure (also referred to as a "jig") is a common type of fishing lure and is typically constructed by partially embedding a hook shank into a metal weight. This metal weight is also known as the jig head, and it is usually made from a dense metal such as lead, steel, brass, or tungsten. The jig hook is comprised of a hook eyelet, a hook shank, a hook barb, and a hook point. A jig barb or wire mount is commonly used to help retain a soft elastomeric lure body that is either slid forward along the hook shank and onto the jig barb or is attached to the wire mount which protrudes from the jig head. The jig can also be made "weedless" by the addition of a hook guard feature, which can protrude from the jig head of the jig fishing lure and protect the hook point. The fishing line knot connects one end of the fishing line to the hook eyelet. The other end of the fishing line is attached to a rod and reel, which the angler uses to cast, flip, or pitch the jig fishing lure into a body of water. After the heavy jig head causes the jig to sink to the bottom or to a depth chosen by the angler, the angler then uses the rod to intermittently lift and twitch the lure while reeling in any slack fishing line in hopes of attracting a fish.

A combination jig and rotating member fishing lure contains some or all of the same elements as the aforementioned jig fishing lure, but with the addition of at least one spinning element or vaned element. Examples of fishing lures that fall into this category are spinnerbaits, buzzbaits, propeller baits, and the like. A combination jig and rotating member fishing lure is typically retrieved at a much faster speed than a jig fishing lure, because the retrieve speed must be fast enough to cause rotation of the spinner, vane, blade, or propeller in order for the lure to emit the desired sound and/or vibration.

The preferred embodiments of this disclosure have several advantages over related art. One drawback of common jig fishing lures is that while the body of the jig is typically created by sliding a soft elastomeric body along the hook shank and onto the jig barb, the head of the jig remains exposed as a hard metal surface, and this hard metal surface does not have the same feeling as a fish's natural prey. A variation of the soft body described above is an elastomeric tube-shaped sleeve body that surrounds both the jig head and hook shank and sometimes also extends beyond the bend of the hook. In either case, however, an advantage of this disclosure is that a separate head cover can provide an angler with the ability to interchange a soft body and a head cover independently of each other in order to achieve a more desired lure appearance.

Lures with entirely interchangeable heads exist wherein the various heads are meant to change the action or movement of the lure in the water. However, if such a removable lure head is not attached, then the desired action or movement of the lure can be lost. As a result, there exists the need for the jig head of a jig fishing lure to remain attached for proper lure action and for the jig head also to be covered with a soft membrane in order to make it feel more lifelike to a fish.

Research has shown that due to their extreme sensitivity to touch and pressure, some fish can distinguish between a hard object and a soft object in a fraction of a second, and that the average retention times for soft lures are far greater than the average retention times for hard lures. Additionally, when water temperatures drop during the winter season, an angler retrieves a fishing lure more slowly in order to tempt a less-aggressive fish. During these months, a softer feeling head cover becomes even more advantageous, because sluggish and lethargic fish often take longer to feel and evaluate the hardness and texture of a lure. Thus, just as the body of the jig is made soft by adding a soft trailer, there is a need to make the head of the jig also soft by adding a soft head cover. The greater the amount of the lure surface area that is soft, the more lifelike the overall tactile experience will be to a fish. This will increase the fish's retention time of the lure and increase the angler's time window for hooking the fish.

SUMMARY OF THE DISCLOSURE

The soft, elastomeric membrane of the head cover envelops the jig head of the jig fishing lure, and the head cover allows for separate soft bodies or soft trailers to be attached to the jig hook shank, jig barb, and/or wire mount. The soft membrane of the head cover can be permanently molded around or attached to the metal jig head, or the soft membrane can be a separate removable member that the angler can assemble. If the soft membrane is removable, then the soft membrane can include at least one aperture for stretching and fitting the soft membrane over the jig head. The fishing line can either threaded through a second small aperture at the front nose area of the soft membrane, or the soft membrane can be slightly cut to allow passage of the fishing line. In either case, the fishing line can then be tied to the hook eyelet. The elasticity of the soft membrane can provide the retention force necessary to keep the head cover attached to the jig head. Also, the exiting fishing line can act to help stabilize and orient the head cover onto the weighted jig head. Additional fish-attracting elements can be attached to the soft membrane, thus making the overall head cover even more lifelike. One or more of these fish-attracting elements can be moved independently of the jig head and jig body by twitching or jiggling the fishing line. The soft membrane can also include a substantially flat side, which can help orient a jig fishing lure at a different angle when resting on a bottom underwater surface. One or more preferred embodiments can be removable without having to break and re-tie the fishing line knot. Furthermore, these removable preferred embodiments can also be compatible with combination jig and rotating member fishing lures.

Objects and advantages of this head cover are as follows:
1. The jig fishing lure head cover or combination jig and rotating member fishing lure head cover provides a softer feeling membrane over the jig head instead of a normally hard metal jig head surface, making the tactile feedback of the soft-covered jig head more pleasing and more palatable to a fish.

2. The jig fishing lure head cover or combination jig and rotating member fishing lure head cover can be permanently attached to the jig head of the lure, which would allow the angler to purchase a lure with the soft head cover already in place.
3. The jig fishing lure head cover or combination jig and rotating member fishing lure head cover can be easily removable and interchangeable without having to also change the soft body member or trailer body member of the lure.
4. The jig fishing lure head cover or combination jig and rotating member fishing lure head cover can be removed or added and not significantly affect the overall buoyancy, action, or movement of the original lure.
5. The jig fishing lure head cover or combination jig and rotating member fishing lure head cover can easily be sized and manufactured to fit pre-existing lures or lures that an angler has already purchased.
6. In one or more of the removable head cover preferred embodiments, the jig fishing lure head cover or combination jig and rotating member fishing lure head cover can be attached or removed without having to break and re-tie the fishing line knot on the hook eyelet.
7. The jig fishing lure head cover or combination jig and rotating member fishing lure head cover can contain additional fish-attracting elements to further entice a fish to strike the lure.
8. The jig fishing lure head cover can contain additional features that act as a hook guard to help avoid snagging the hook point of the lure on underwater objects.
9. The jig fishing lure head cover can orient or position the jig fishing lure at a different angle when the jig fishing lure is resting on a bottom underwater surface.
10. The jig fishing lure head cover can protect the fishing line knot from being frayed or cut due to contact with underwater objects.
11. One or more fish-attracting elements of the jig fishing lure head cover can be made to move independently of the jig fishing lure by twitching or jiggling the fishing line.

These and other objects and advantages will become readily apparent upon review of the following specification and drawings.

Figure 1:
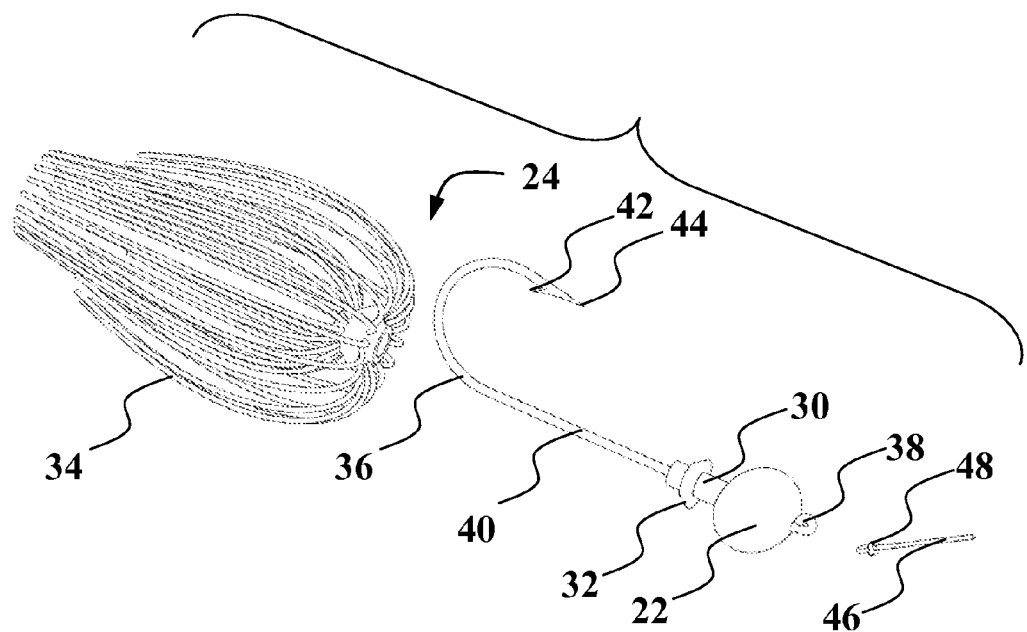
FIG. 1 is a diagrammatic exploded view of a common jig fishing lure.

DRAWINGS—REFERENCE NUMERALS 20 head cover
22 weighted jig head
24 jig fishing lure
26 combination jig and rotating member fishing lure
28 elastomeric membrane
30 jig collar
32 jig barb
34 soft body member
36 hook
38 hook eyelet
40 hook shank
42 hook barb
44 hook point
46 fishing line
48 fishing line knot
50 outer surface
52 cavity
54 inner surface
56 first aperture
58 first fish-attracting element
60 second aperture
62 grooved cuts
64 third aperture
66 additional protruding member
68 second fish-attracting element
70 pair of apertures
72 extension member
74 substantially flat surface
76 rotating member
78 hook shank entrance
80 hook shank exit
82 continuous edge
84 circular portion
86 slotted portion
88 wire frame

DETAILED DESCRIPTION OF PREFERRED EMBODIMENTS

The preferred embodiments, as illustrated in FIGS. 2-15, describe a head cover 20 that envelops a weighted jig head 22 of a jig fishing lure 24 or combination jig and rotating member fishing lure 26. The head cover 20 can be permanently joined to the jig head 22 or it can be a separate removable member. The head cover 20 shown in FIGS. 2-15 provides a means for an angler to substantially cover the jig head 22 with an elastomeric membrane 28.

FIG. 1 illustrates the primary components of a common jig fishing lure 24. The jig head 22 is typically made from a dense material. A jig collar 30 with jig barb 32 or other means for securing a soft body member 34 to the jig fishing lure 24 can be integrated with or separately attached to the jig head 22. A hook 36 is partially embedded in the jig head 22, and the hook 36 consists of a hook eyelet 38, a hook shank 40, a hook barb 42, and a hook point 44. Fishing line 46 is then attached to the jig fishing lure 24 by tying a fishing line knot 48 to the hook eyelet 38. It should be understood here that the hook eyelet 38 is considered a first protruding member of the jig head 22 and that the hook shank 40 is considered a second protruding member of the jig head 22.

Figure 2A:
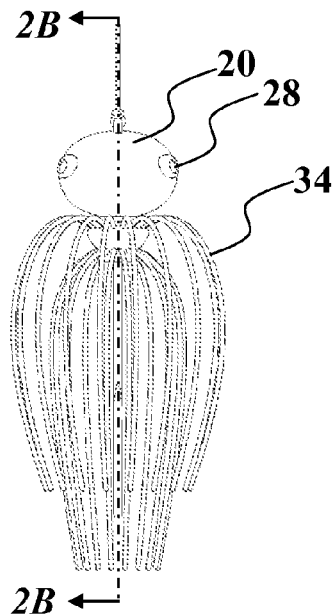
FIG. 2A is a top view of a jig fishing lure with a first preferred embodiment of a head cover attached that corresponds to the diagrammatic cross sectional view shown in FIG. 2B. Note that the location of the cutting plane used in FIG. 2A is also the same location of the cutting plane used for all cross sectional views of all preferred embodiments.
Figure 2B:
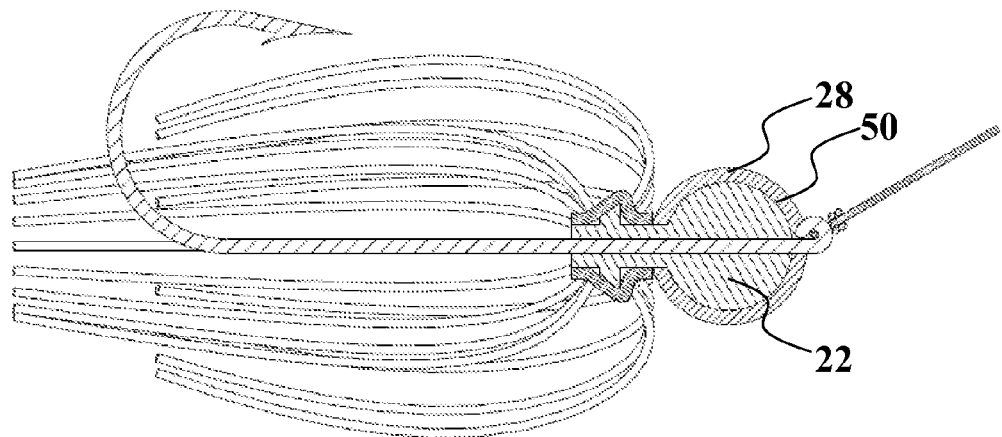
FIG. 2B is a diagrammatic cross sectional view that illustrates the first preferred embodiment of a head cover wherein a soft membrane is permanently attached to a jig head of a jig fishing lure.

FIGS. 2A and 2B show a preferred embodiment wherein the elastomeric membrane 28 is permanently bonded to an outer surface 50 of the jig head 22. Such a permanent bond could be obtained by molding an elastomer cover directly onto the jig head 22 itself through a process such as rubber overmolding, two-shot injection molding, dip molding, pouring, or similar. This would allow the lure to be sold with the elastomeric membrane 28 already enveloping the jig head 22. In this preferred embodiment, the elastomeric membrane 28 would not be removable by an angler.

Figure 3:
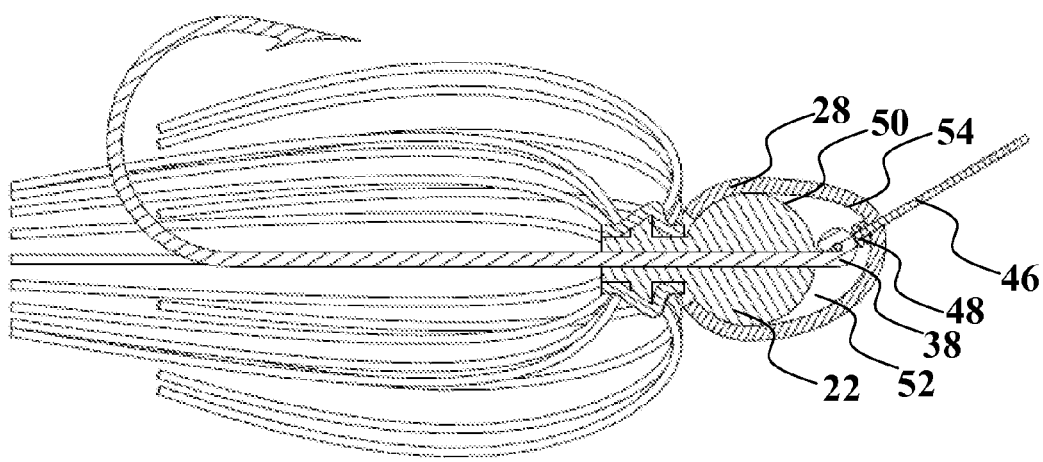
FIG. 3 is a diagrammatic cross sectional view of a jig fishing lure with a second preferred embodiment of a head cover attached wherein a soft membrane is a removable member containing a first aperture for assembling or fitting the soft membrane onto a jig head of a jig fishing lure.

As shown in FIG. 3, the elastomeric membrane 28 is not permanently bonded to the outer surface 50 of the jig head 22; thus, an angler could attach and detach the elastomeric membrane 28 as desired. The elastomeric membrane 28 also covers the hook eyelet 38 and fishing line knot 48, thus creating a small cavity 52 inside the elastomeric membrane 28 between the outer surface 50 of the jig head 22 and an inner surface 54 of the elastomeric membrane 28. In this same preferred embodiment shown in FIG. 3, the elastomeric membrane 28 also acts to protect the fishing line knot 48 from nicks, scrapes, and cuts. The angler can cut a small slit in the front of the elastomeric membrane 28 for threading the fishing line 46 through in order to tie the fishing line knot 48 onto the hook eyelet 38.

Figure 4A:
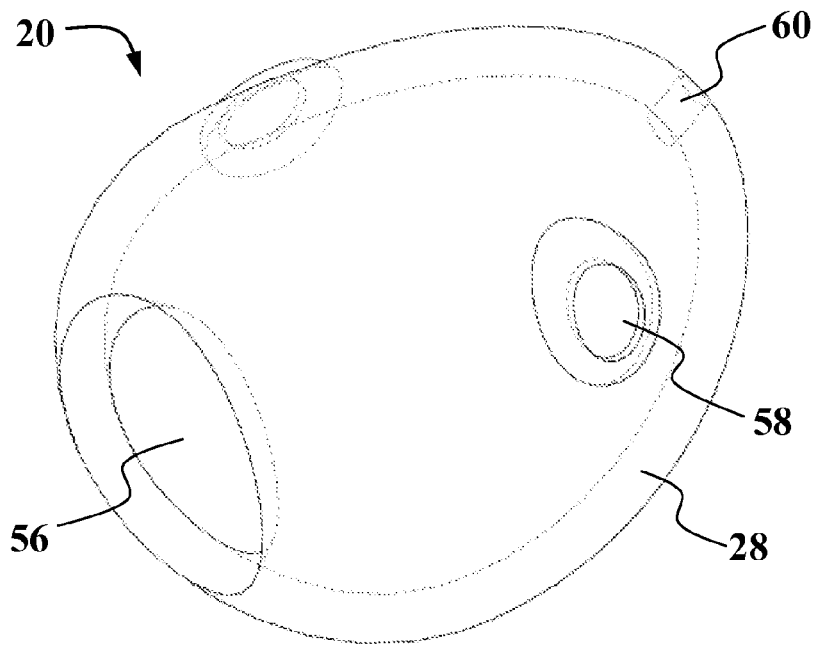
FIG. 4A is a diagrammatic perspective view of a third preferred embodiment of a head cover showing a first aperture for stretching and assembling the soft membrane around a jig head and a second aperture for accommodating a fishing line at the front of the soft membrane.

In FIG. 4A, a first aperture 56 is shown that is large enough to allow the elastomeric membrane 28 to stretch and fit over the jig head 22. An example of a first fish-attracting element 58 is shown in FIG. 4A as well. Again, making the elastomeric membrane 28 removable allows anglers to add or remove the entire head cover 20 as desired. Also shown in FIG. 4A, the elastomeric membrane 28 can contain a second aperture 60 that allows the fishing line 46 to pass through the front of the elastomeric membrane 28 in order to tie the fishing line knot 48 to the hook eyelet 38. Such a second aperture 60 would prevent the angler from having to cut a slit in the elastomeric membrane 28 in order to insert the fishing line 46 and tie the fishing line knot 48.

Figure 4B:
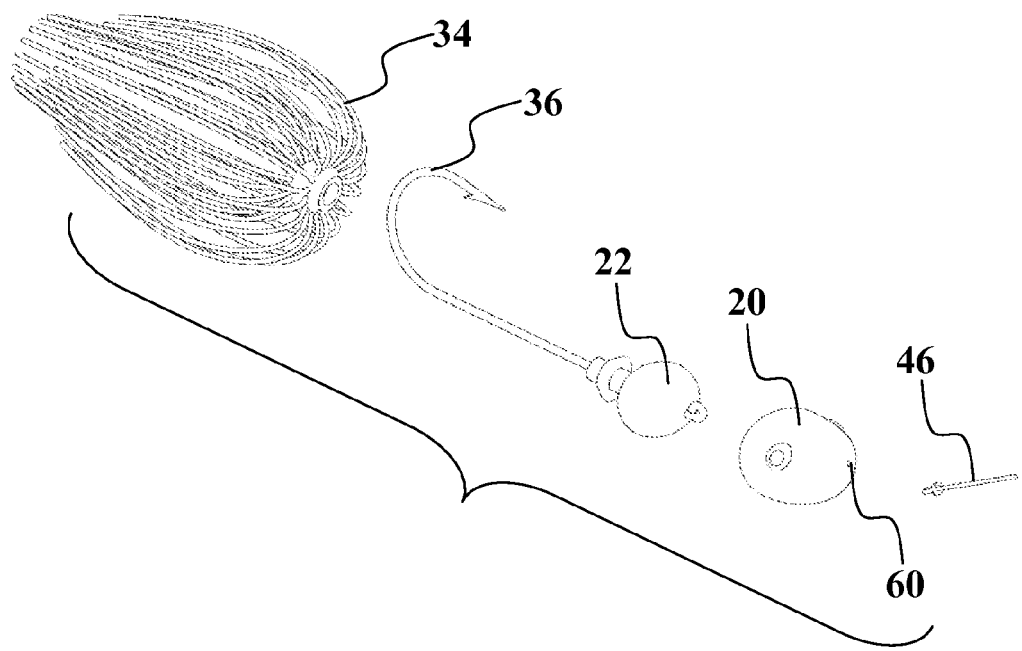
FIG. 4B is a diagrammatic exploded perspective view showing how the third preferred embodiment is generally integrated with the common elements of a jig fishing lure.
Figure 4C:
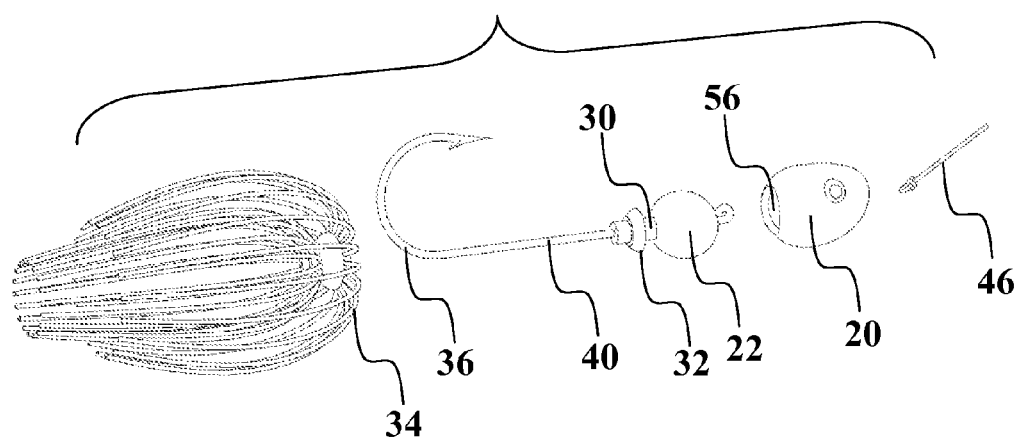
FIG. 4C is a diagrammatic exploded perspective view of the same elements shown in FIG. 4B, but the elements are illustrated at a different viewing angle.

The exploded views of FIG. 4B and FIG. 4C show the general components of a jig fishing lure 24 like FIG. 1, but with the third preferred embodiment of the head cover 20 included. In these views, the first aperture 56 and second aperture 60 of the head cover 20 are clearly visible.

Figure 4D:
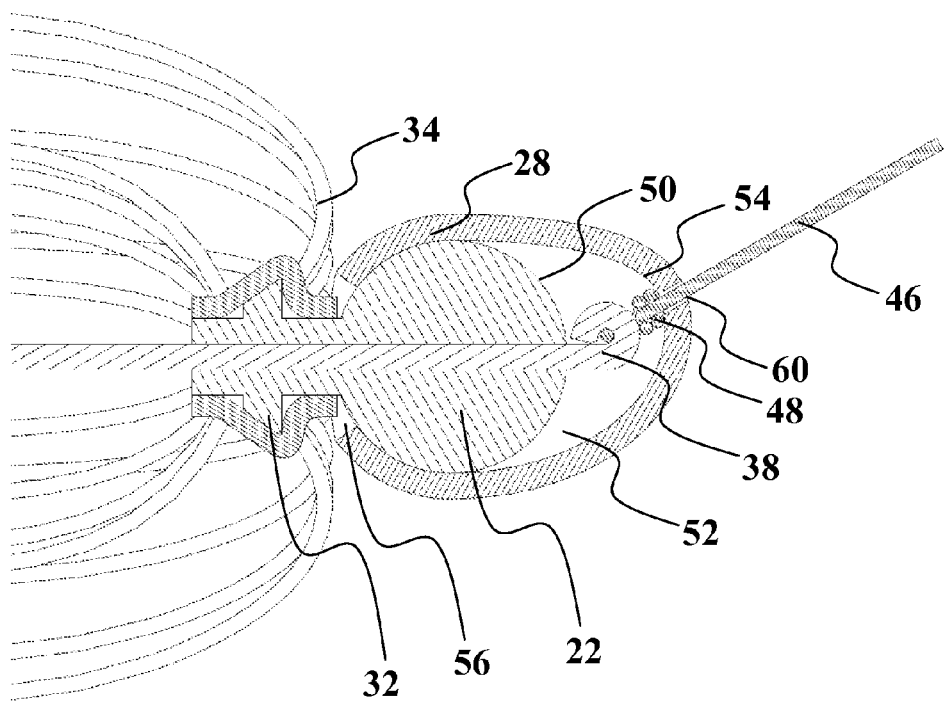
FIG. 4D is an enlarged diagrammatic cross sectional view of a front portion of a jig fishing lure with the third preferred embodiment of a head cover attached.

The enlarged cross sectional view of FIG. 4D shows the third preferred embodiment in greater detail. One can see that the size of the second aperture 60 is small enough to still protect the fishing line knot 48 from nicks, scrapes, and cuts.

Figure 5:
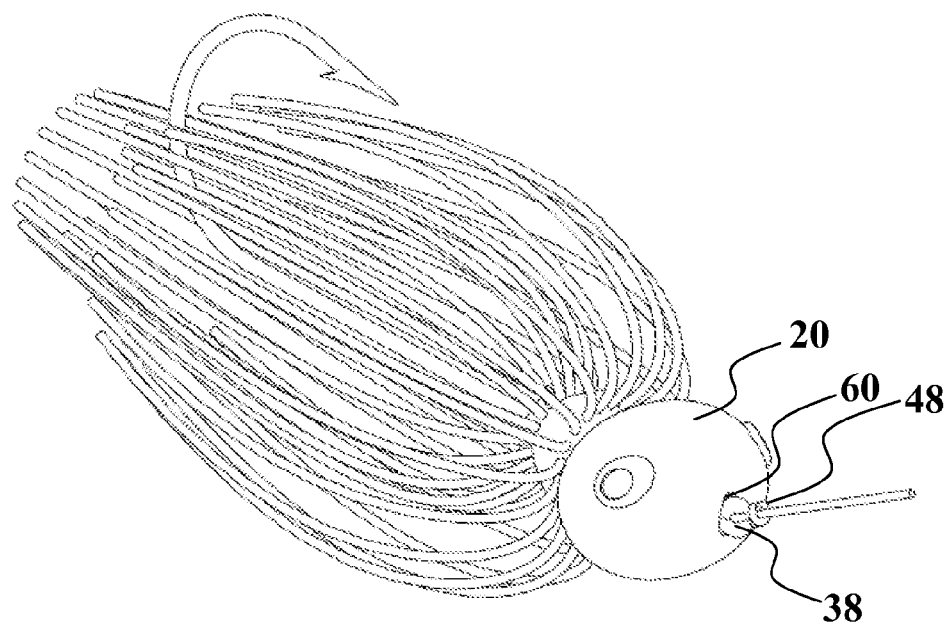
FIG. 5 is a diagrammatic perspective view of a jig fishing lure with a fourth preferred embodiment of a head cover attached wherein a second aperture is large enough to allow an angler access to a hook eyelet.

As shown in FIG. 5, the second aperture 60 can be larger and surround the hook eyelet 38 rather than cover the hook eyelet 38. A primary advantage of this preferred embodiment is that a new fishing line knot 48 can be tied without having to remove the head cover 20 in order to access the hook eyelet 38.

Figure 6:
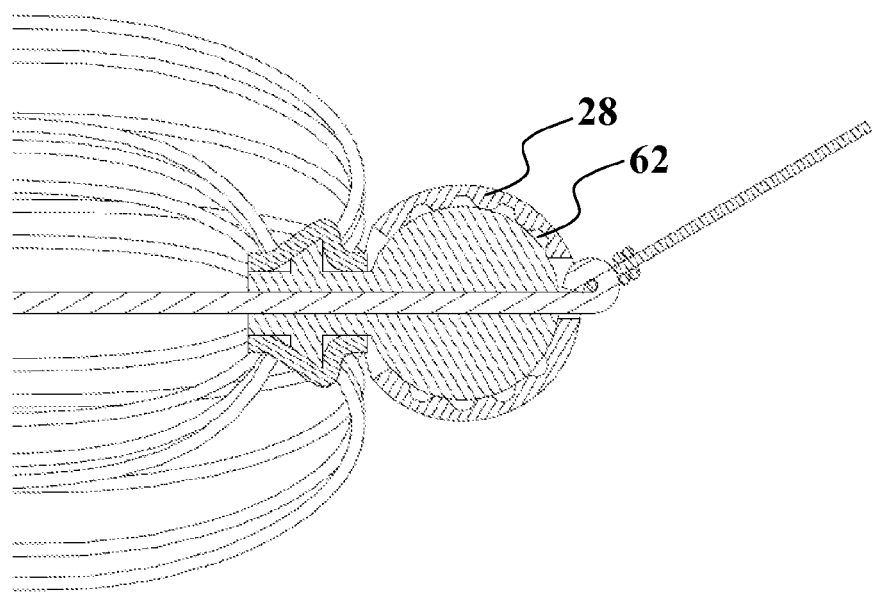
FIG. 6 is an enlarged diagrammatic cross sectional view of a jig fishing lure with a fifth preferred embodiment of a head cover attached wherein the cross section of the soft membrane is not constant, so as to make the soft membrane feel even softer for a given wall thickness.

As shown in FIG. 6, the wall thickness of the elastomeric membrane 28 of the head cover 20 is not constant. One or more grooved cuts 62 are added to the inner surface 54 of the elastomeric membrane 28. Such recesses or indentations allow for further improvements in softness without having to increase the wall thickness of the elastomeric membrane 28. In addition to the grooved cuts 62, other recess shapes and patterns can be used such as slots, dimples, rings, and the like.

Figure 7A:
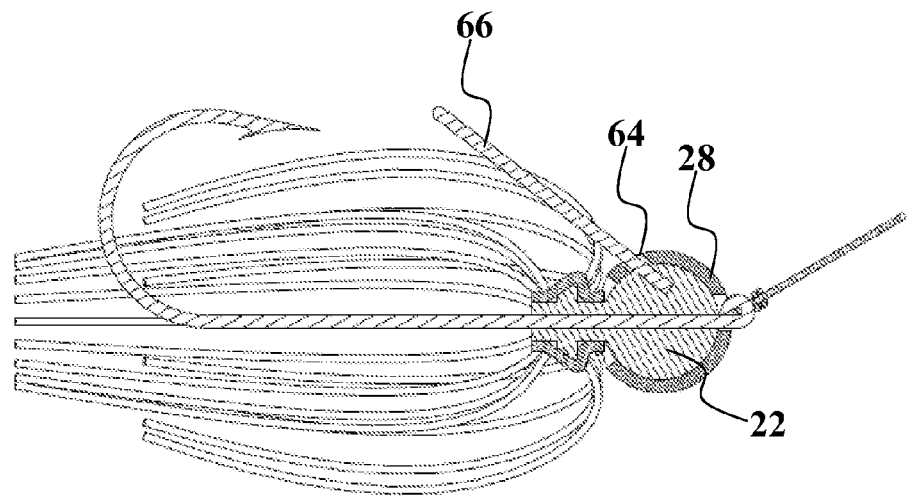
FIG. 7A is a diagrammatic cross sectional view of a jig fishing lure with a sixth preferred embodiment of a head cover attached wherein a third aperture is formed around a protruding member of a jig head, wherein the protruding member is a weed guard feature to help prevent snagging the hook point on underwater objects.
Figure 7B:
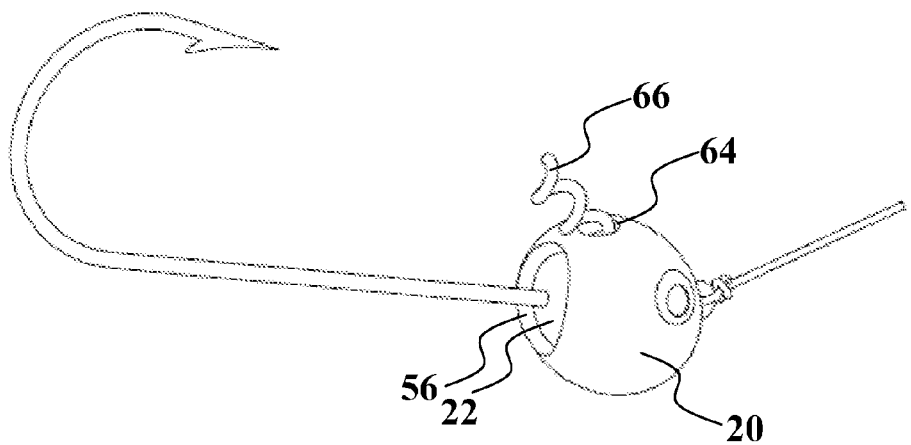
FIG. 7B is a diagrammatic perspective view of a jig fishing lure showing the same sixth preferred embodiment of a head cover attached wherein a third aperture is formed around a protruding member of a jig head, wherein the protruding member is a coil wire soft body mount for attaching a soft body member or soft trailer member to the jig fishing lure.

As shown in FIG. 7A, a third aperture 64 can be added to surround an additional protruding member 66 of the jig head 22. An example of this additional protruding member 66 that is sometimes included in a jig fishing lure 24 is a weed guard, a coil wire soft body mount, a barbed wire soft body mount, and the like. In FIG. 7A, the additional protruding member 66 is represented by a weed guard. In FIG. 7B, the additional protruding member 66 is represented by a coil wire soft body mount. Note that in FIG. 7B, the jig fishing lure 24 does not include a jig collar 30 and jig barb 32, because the coil wire soft body mount provides the retention force necessary to secure a soft elastomeric body such as a grub, worm, lizard, and the like.

Figure 8:
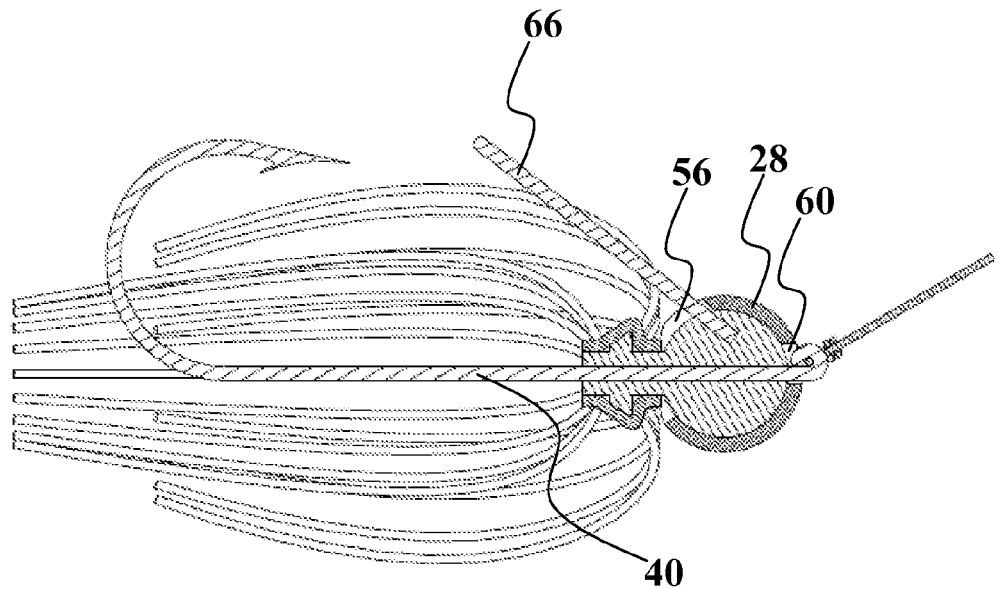
FIG. 8 is a diagrammatic cross sectional view of a jig fishing lure with a seventh preferred embodiment of a head cover attached wherein a first aperture surrounds both a hook shank and a weed guard protruding member.

A variation of the preferred embodiment of FIG. 7A is shown in FIG. 8. In FIG. 8, the size and location of the first aperture 56 is positioned such that the first aperture 56 surrounds both the hook shank 40 and the additional protruding member 66. This eliminates the need for the third aperture 64 as described in FIG. 7A.

Figure 9:
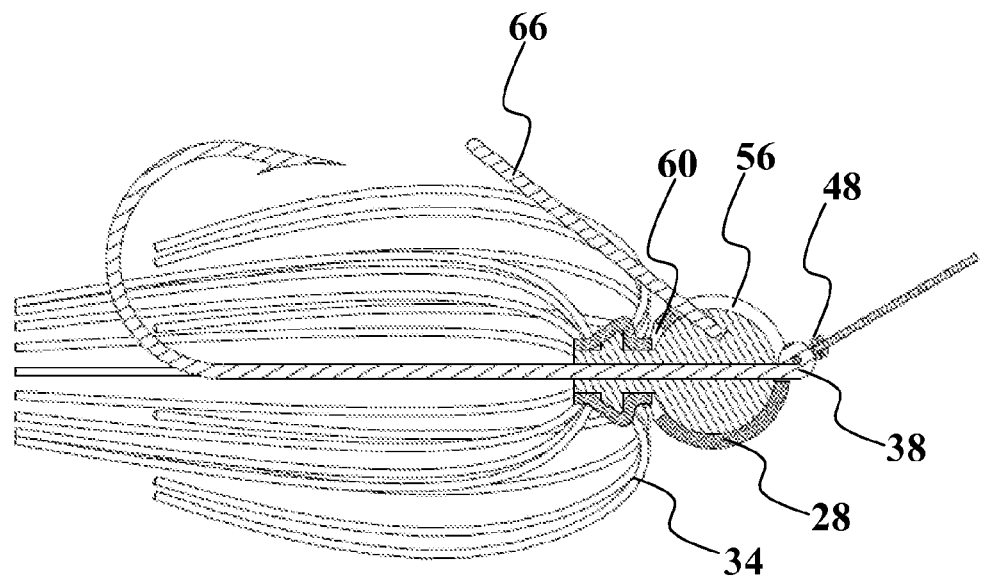
FIG. 9 is a diagrammatic cross sectional view of a jig fishing lure with an eighth preferred embodiment of a head cover attached wherein a second aperture surrounds both a weed guard and hook eyelet protruding member.

FIG. 9 is also a variation of the preferred embodiment of FIG. 7A. In FIG. 9, the size and location of the first aperture 56 are selected such that the first aperture 56 surrounds both the additional protruding member 66 and hook eyelet 38. The preferred embodiment of FIG. 9 also eliminates the need for the third aperture 64 of FIG. 7A. Note that in the preferred embodiment of FIG. 9, the head cover 20 can be removed and reattached without having to re-tie a new fishing line knot 48. However, this would not be practical in FIG. 9, since, to remove the head cover 20 without re-tying the fishing line knot 48, the head cover 20 must be slid around the soft body member 34 and down the entire length of the hook 36. A much easier way to remove and reattach a head cover 20 without re-tying the fishing line knot 48 is shown by the preferred embodiment in FIGS. 10A and 10B.

Figure 10A:
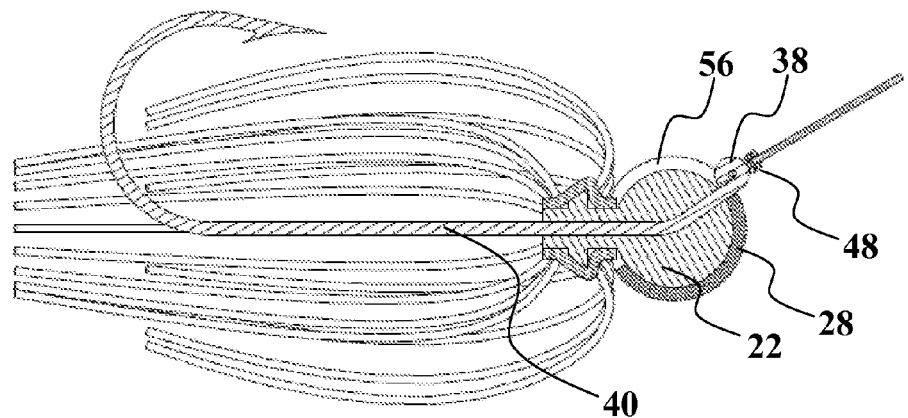
FIG. 10A is a diagrammatic cross sectional view of a jig fishing lure with a ninth preferred embodiment of a head cover attached wherein a first aperture surrounds both the front and back exit of an embedded hook shank.
Figure 10B:
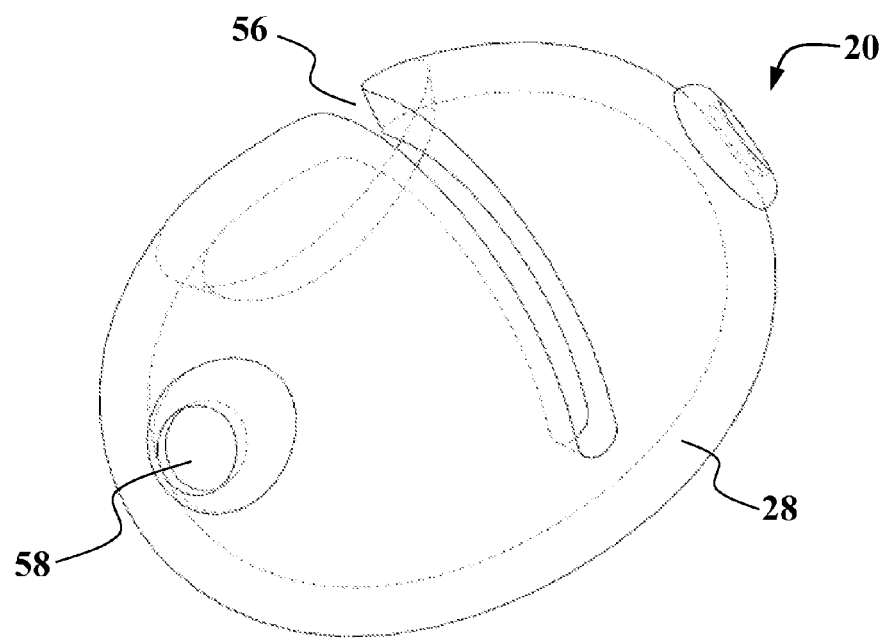
FIG. 10B is a diagrammatic perspective view of the ninth preferred embodiment of the head cover that is shown in FIG. 10A.

Some jig lures have the hook eyelet 38 exiting closer towards the top of the jig head 22, in which case the first aperture 56 of the head cover 20 can surround both the hook eyelet 38 and hook shank 40, as shown in FIG. 10A. This preferred embodiment of the head cover 20, shown again in FIG. 10B, also eliminates the need for the third aperture 64 of FIG. 7A. Furthermore, like FIG. 9, the preferred embodiment of FIGS. 10A and 10B allows for removal and reattachment of the head cover 20 without having to re-tie the fishing line knot 48. Note that compared to FIG. 9, removing the head cover 20 of FIG. 10B without having to re-tie the fishing line knot 48 is much easier since the first aperture 56 can also extend to surround the hook eyelet 38. This allows the angler to remove the head cover 20 by simply pulling forward on the head cover 20 until it slides off of the jig head 22.

Figure 10C:
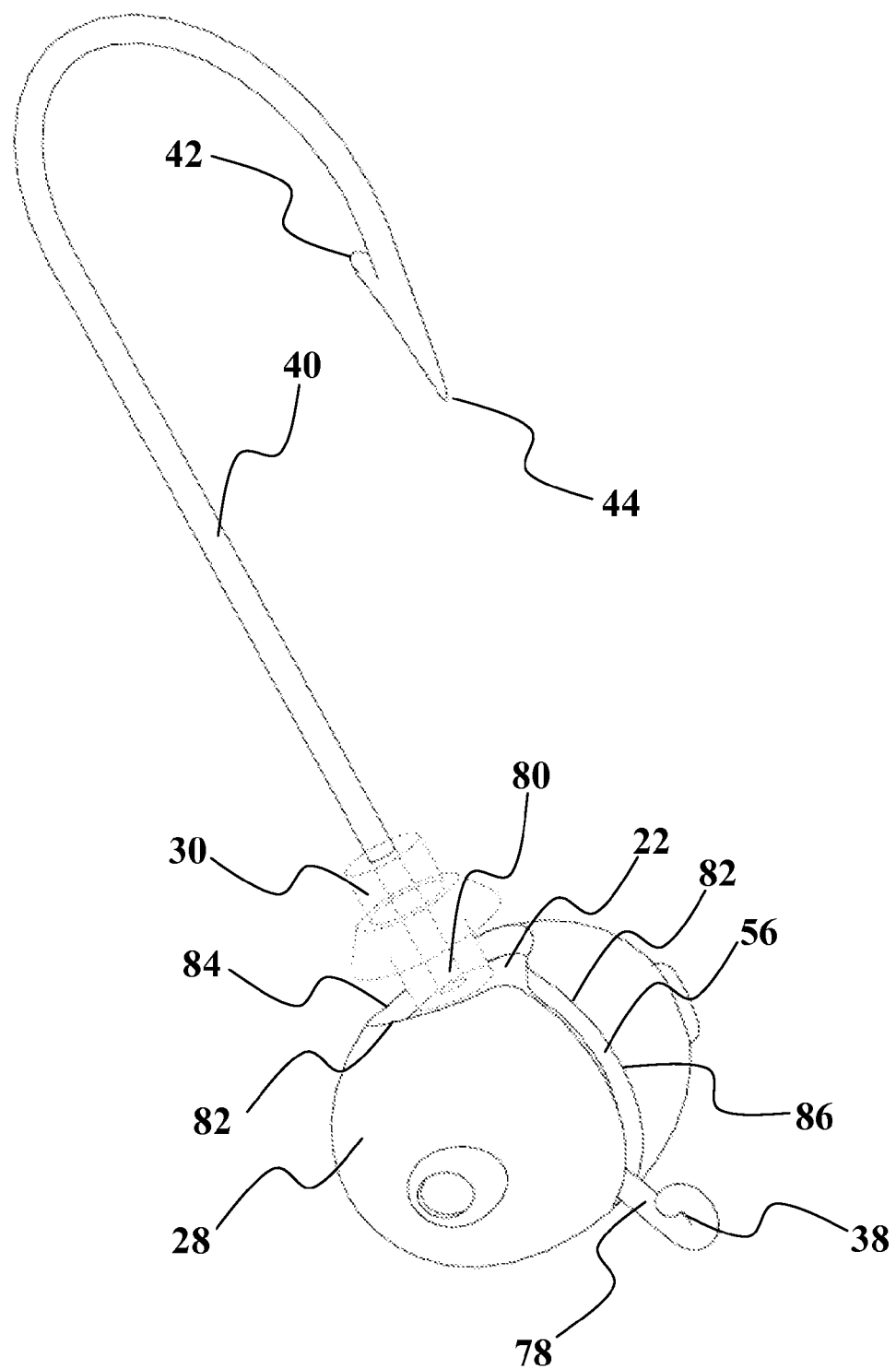
FIG. 10C is a diagrammatic perspective view of the ninth preferred embodiment for a head cover shown attached to a jig fishing lure. The lure soft body member is removed and the jig collar is shown by hidden lines in order to show greater detail regarding how the head cover attaches to the weighted head of a pre-existing jig fishing lure or combination jig and rotating member fishing lure.

FIG. 10C further illustrates how a continuous edge 82 of the shaped aperture 56 simultaneously surrounds both the hook shank entrance 78 into and hook shank exit 80 from the weighted jig head 22. The continuous edge 82 of the shaped aperture 56 is defined by a generally circular portion 84 and a generally slotted portion 86 extending therefrom which simultaneously circumscribes both the hook shank entrance 78, with the slotted portion 86 of the aperture, into the weighted jig head 22 near the hook eyelet 38 and the hook shank exit 80, with the circular portion 84 of the aperture, from the weighted jig head 22 near the beginning of the generally long portion of the hook shank 40. It should be noted that the hook shank entrance 78 into the weighted jig head 22 is adjacent to the hook eyelet 38, while the hook shank exit 80 from the jig head 22 is adjacent to the generally long portion of the hook shank 40. The generally long portion of the hook shank 40, hook barb 42, and hook point 44 of the pre-existing jig fishing lure 24 all desirably remain exposed after attachment of the head cover 20.

Figure 11A:
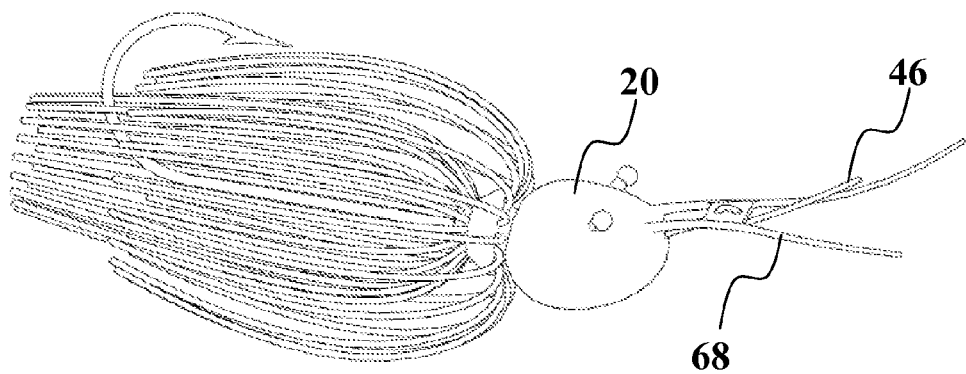
FIGS. 11A and 11B are a diagrammatic perspective view and a diagrammatic cross sectional view, respectively, of a jig fishing lure with a tenth preferred embodiment of a head cover attached wherein at least one fish-attracting element of the head cover can be made to flutter by twitching or jiggling a fishing line.
Figure 11B:
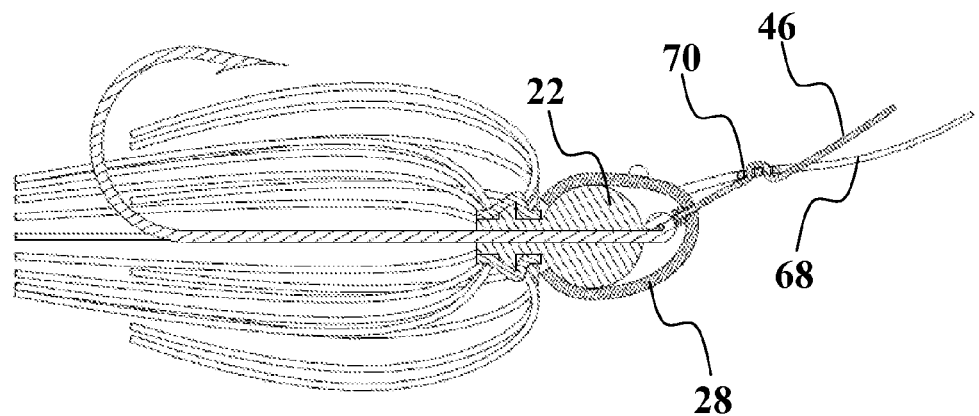

As shown in FIG. 11A, the fishing line 46 passes through a second fish-attracting element 68 at a predetermined distance in front of the jig head 22. When the fishing line 46 is twitched or jiggled, the second fish-attracting element 68 can flutter. This allows for movement of the second fish-attracting element 68 without moving the jig head 22 of the jig fishing lure 24. This independent movement of one or more additional fish-attracting elements can further entice a fish to strike. Note that in the cross sectional view shown in FIG. 11B, the fishing line 46 is threaded through a pair of apertures 70 contained within the second fish-attracting element 68 of the head cover 20. This pair of apertures 70 is just one example of a means for creating contact between one or more fish-attracting elements and the fishing line 46.

Figure 12:
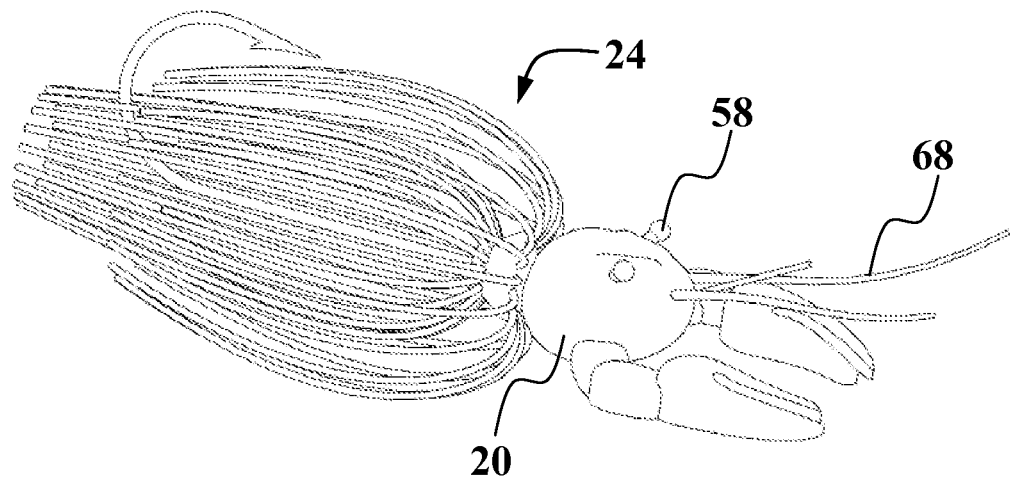
FIG. 12 is a diagrammatic perspective view of a jig fishing lure with an eleventh preferred embodiment of a head cover attached wherein the head cover contains at least one fish-attracting element for mimicking the prey of a fish.

As shown in FIG. 12, the head cover 20 of any preferred embodiment can comprise one or more fish-attracting features and elements such as, but not restricted to, an eye, a mouth, antennae, tentacles, pinchers, and the like in order to cause the jig fishing lure 24 to more accurately mimic the natural prey of a fish.

Figure 13A:
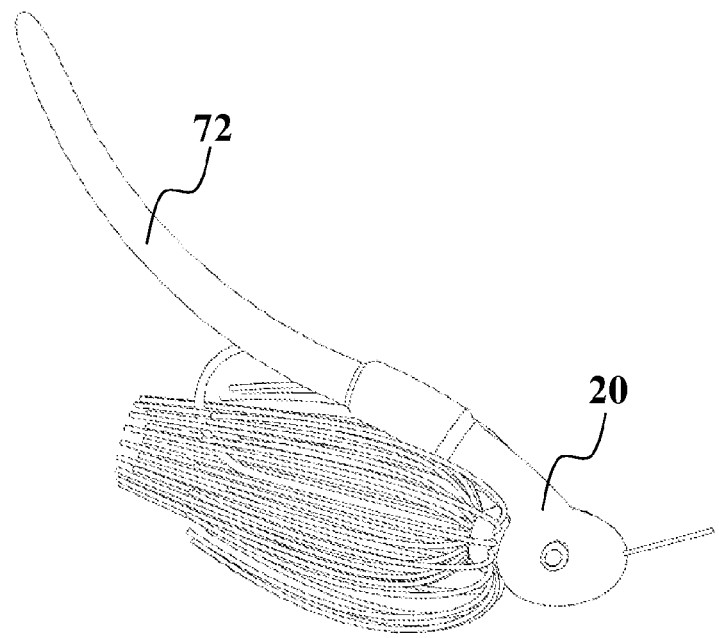
FIGS. 13A and 13B are a diagrammatic perspective view and a diagrammatic cross sectional view, respectively, of a jig fishing lure with a twelfth preferred embodiment of a head cover attached wherein an extension member extends from the soft membrane. A hook barb is inserted into this elongated extension member, such that the extension member becomes a weed guard for the hook barb to help prevent snagging of the hook point on underwater objects.
Figure 13B:
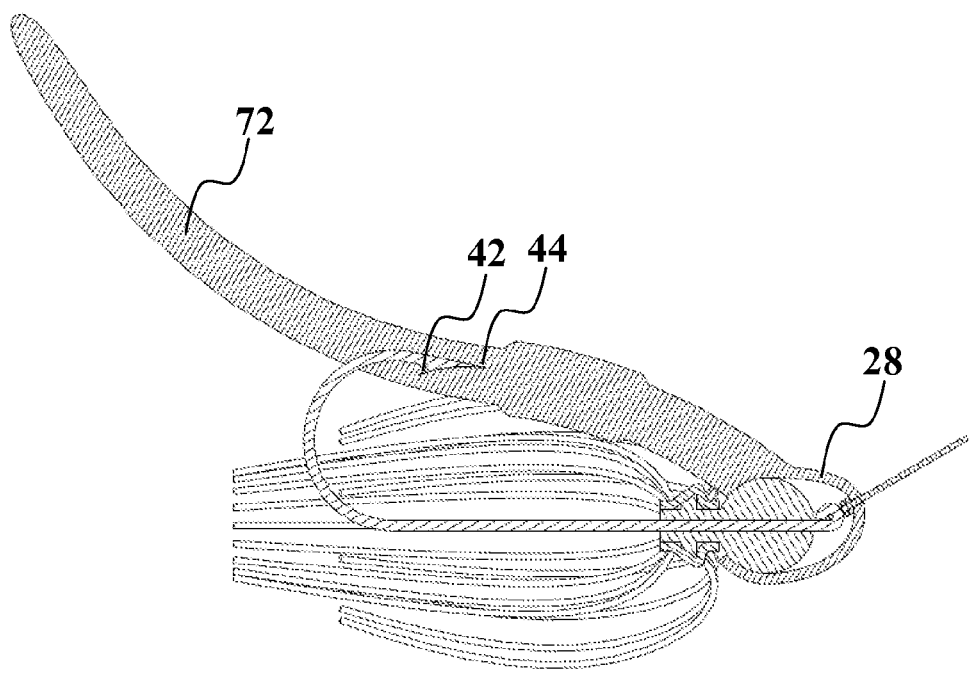

If the weed guard is not present on the jig fishing lure 24, then an alternate protector of the hook point 44 can be made from an extension member 72 of the elastomeric membrane 28, together forming the head cover 20, as shown in FIGS. 13A and 13B. The hook point 44 is inserted into the extension member 72 such that the extension member 72 is secured in place by the hook barb 42. This extension member 72 protects the hook point 44 and helps prevent the jig fishing lure 24 from being snagged on underwater objects. It should be understood that this extension member 72 can also serve as an additional fish-attracting element. It should also be noted that the head cover 20 in FIGS. 13A and 13B can be made, if desired, to be removable without having to re-tie the fishing line knot 48, similar to the preferred embodiment of the head cover 20 shown in FIG. 10B. In fact, one can see that making any preferred embodiment easily removable can be accomplished by extending the first aperture 56 such that it also surrounds the hook eyelet 38.

Figure 14:
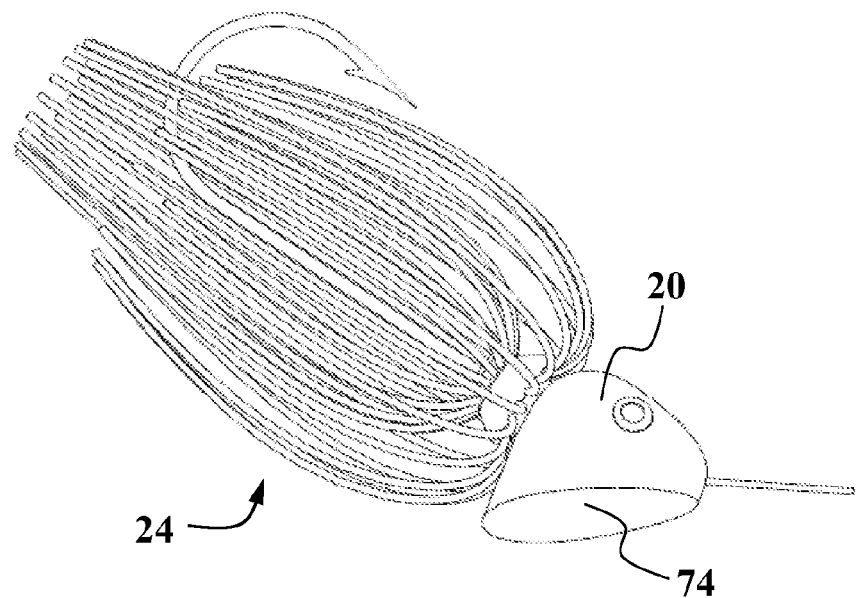
FIG. 14 is a diagrammatic perspective view of a jig fishing lure with a thirteenth preferred embodiment of a head cover attached wherein the head cover includes a large flat side, thus allowing the jig fishing lure to rest on the bottom underwater surface at a desirably different angle or orientation.

The exterior shape of the elastomeric membrane 28 does not necessarily have to conform to the shape of the jig head 22. As shown in FIG. 14, the head cover 20 has a substantially flat surface 74 on one side. This substantially flat surface 74 can help the jig fishing lure 24 stand upright or achieve any other desired orientation when the jig fishing lure 24 is resting on an underwater surface.

Figure 15:
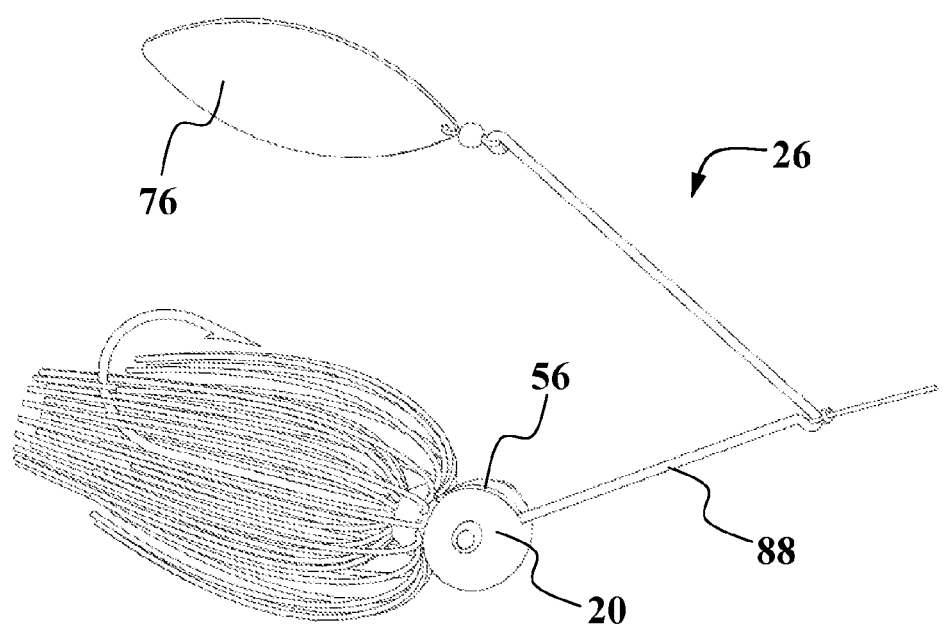
FIG. 15 is a diagrammatic perspective view of a combination jig and rotating member fishing lure with a fourteenth preferred embodiment of a head cover attached. The head cover can also be permanent or removable for this type of lure, as well.

As shown in FIG. 15, the removable jig head cover 20 can be attached to the weighted jig head 22 of a combination jig and rotating member fishing lure 26, such as a spinnerbait or buzzbait. Because the first aperture 56 surrounds the locations where the wire frame 88 enters the weighted jig head 22 and hook 36 exits the weighted jig head 22, the head cover 20 can be easily interchangeable. Thus, the shape of the first aperture 56 in the preferred embodiment of FIG. 15 is similar to the shape of the first aperture 56 in the preferred embodiment of FIG. 10B. The rotating member 76 can be a spinner, vane, blade, propeller, or similar. It should be noted that the jig head cover 20 for such a combination jig and rotating member fishing lure 26 could also be permanently attached, similar to the preferred embodiment shown in FIG. 1.

The elastomeric membrane 28 of the head cover 20 can be made from a soft elastomeric material that is commonly used in making artificial fishing lures. However, it should be recognized that some or all of the head cover 20 can be made from one or a combination of the following materials: open cell foam, closed cell foam, leather, felt, fabric, heat shrink tubing material, natural rubber, a synthetic rubber, a thermoplastic elastomer, a thermoplastic vulcanizate, a thermoplastic polyurethane, a thermoplastic olefin, a thermoplastic polymer, plastisol, and the like. Multiple durometers of a given material can also be combined to make the head cover 20. Also, one advantage of using an absorbable material for the elastomeric membrane 28 such as open cell foam is that chemical fish attractants can be applied to the absorbable material, providing a means for the chemical attractants to slowly disperse in the water surrounding the lure.

Many features can be considered fish-attracting elements, such as any exterior anatomical feature found on worms, grubs, baitfish, insects, crayfish, lizards, salamanders, snakes, frogs, crabs, eels, shrimp, squid, and other natural prey of a fish. In addition, the head cover 20 can be made of different colors and can include plastic or metallic reflective elements, an embedded rattle, a rattle attachment, and the like.

Again, the head cover 20 consists of an elastomeric membrane 28 which can also include one or more apertures to assist with assembly, one or more fish-attracting elements to entice a fish, one or more extension members 72 to protect the hook point 44, and any other feature to make the head cover 20 or fishing lure look and feel more appealing to a fish. In all of the preferred embodiments of the head cover 20, it should be emphasized that the elastomeric membrane 28 and soft body member 34 remain separate from each other. The soft body member 34, such as skirt, sleeve, tube, grub, worm, lizard, crayfish, and the like, can be attached and replaced independently of the head cover 20. Also, it should be understood that the jig collar 30 and jig barb 32 can be replaced by a different type of mount for the soft body member 34, such as a coil wire soft body mount, a barbed wire soft body mount, and the like. It should also be readily apparent that further means to help anchor the head cover 20 to the jig head 22 can include having additional protrusions extend from the jig head 22 and pass through additional apertures in the head cover 20.

The shape and texture of the elastomeric membrane 28 can also vary. While the elastomeric membrane 28 can conform to the same shape as the jig head 22 or the elastomeric membrane 28 can also include a substantially flat surface 74, it can also be concave, convex, or any other shape. These surfaces can help achieve a desirably different behavior and/or orientation of the jig fishing lure 24 or combination jig and rotating member fishing lure 26. It is also readily apparent that the exterior surface of the elastomeric membrane 28 can be engraved with any texture or pattern so as to create a desirably different tactile feeling as compared to a smooth exterior surface. In addition, it is possible for the elastomeric membrane 28 to be modular in construction or made of more than one member or section.

It should also be understood that one or more preferred embodiments of the head cover can be added to any pre-existing jig fishing lure 24 or combination jig and rotating member fishing lure 26 simply by attaching the head cover 20. In other words, an angler would not need to throw away any existing lures that he or she already owns in order to be able to use one or more of the preferred embodiments.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A cover for a pre-existing jig-type fishing hire having a hook partially embedded in a weighted head, wherein the hook has a shank extending from a first location on the weighted head and an eyelet extending from a second location on the weighted head for the coupling of a fishing line thereto, comprising:
   an elastomeric membrane having an aperture defined by a first portion having a generally rounded shape and a second portion having a generally slotted shape extending therefrom;
   wherein the aperture simultaneously circumscribes both the shank and the eyelet or both the shank and a fishing line coupled to the eyelet;
   wherein the cover is dimensioned so as to stretch and fit over the weighted head and to be retained solely by the elasticity of the membrane; and
   wherein the cover can be attached to or removed from the weighted head while the fishing line is coupled to the eyelet.

2. The cover for a pre-existing jig-type fishing lure according to claim 1, wherein the membrane further comprises at least one element for attracting fish.

3. The cover for a pre-existing jig-type fishing lure according to claim 2, wherein the at least one element for attracting fish is in the shape of an anatomical feature of a worm, grub, fish, insect, crayfish, lizard, salamander, snake, frog, crab, eel, or shrimp.

4. The cover for a pre-existing jig-type fishing lure according to claim 1, wherein the at least one element for attracting fish is generally elongated in shape and is capable of being secured to the hook when the cover is attached to the weighted head of the pre-existing lure.

5. The cover for a pre-existing jig-type fishing lure according to claim 1, wherein the elastomeric membrane comprises a combination of more than one material.

6. The cover for a pre-existing jig-type fishing lure according to claim 1, wherein the membrane further comprises at least one substantially flat surface, at least one substantially concave surface, or at least one substantially convex surface.

7. The cover for a pre-existing jig-type fishing lure according to claim 1, wherein a generally hollow cavity is formed between a portion of the outer surface of the weighted head and a portion of the inner surface of the membrane.

8. The cover for a pre-existing jig-type fishing lure according to claim 1, wherein the membrane further comprises at least one additional aperture capable of accommodating additional elements of the pre-existing jig head.

9. The cover for a pre-existing jig-type fishing lure according to claim 2, wherein the membrane further comprises a means for creating contact between the at least one element for attracting fish and the fishing line.

10. A cover for a pre-existing jig-type fishing lure having a first protruding member extending from a first location on a weighted head and having a second protruding member extending from a second location on the weighted head, wherein the first protruding member further comprises a means for the coupling of a fishing line thereto, comprising:
- an elastomeric membrane having an aperture;
- wherein the aperture is defined by a first portion having a first shape and a second portion having a generally slotted shape extending therefrom;
- wherein a width dimension of the first portion is generally greater than a width dimension of the second portion;
- wherein the width dimension of the first portion and the width dimension of the second portion are oriented and measured perpendicular to a median plane of the lure;
- wherein the aperture simultaneously circumscribes both the first, protruding member and the second protruding member or both the second protruding member and a fishing line coupled to the first protruding member;
- wherein the cover is dimensioned so as to stretch and fit over the weighted head and to be retained solely by the elasticity of the membrane; and
- wherein the cover can be attached to or removed from the weighted head while the fishing line is coupled to the first protruding member.

11. A corer for a pre-existing jig-type fishing lure having a rigid wire member partially embedded in a weighted head, wherein a first protruding portion of the rigid wire member extends from a first location on a weighted head and has an eyelet for the coupling of a fishing line thereto, wherein a second protruding portion of the rigid wire member extends from a second location on the weighted head, comprising:
- an elastomeric membrane having an aperture defined by a first portion having a generally rounded shape and a second portion having a generally slotted shape extending therefrom;
- wherein the aperture simultaneously circumscribes both the first protruding portion and the second protruding portion or both the second protruding portion and a fishing line coupled to the eyelet;
- wherein the cover is dimensioned so as to stretch and fit over the weighted head and to be retained solely by the elasticity of the membrane; and
- wherein the cover can be attached to or removed from the weighted head while the fishing line is coupled to the eyelet.

* * * * *